(12) United States Patent
Leara et al.

(10) Patent No.: US 11,423,148 B2
(45) Date of Patent: Aug. 23, 2022

(54) PREVENTING DISCOVERY OF UNIQUE IDENTIFIERS IN FIRMWARE

(71) Applicant: Dell Products L.P., Round Rock, TX (US)

(72) Inventors: William D. Leara, Round Rock, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 16/920,188

(22) Filed: Jul. 2, 2020

(65) Prior Publication Data

US 2022/0004637 A1 Jan. 6, 2022

(51) Int. Cl.

| G06F 15/177 | (2006.01) |
|---|---|
| G06F 9/00 | (2006.01) |
| G06F 21/57 | (2013.01) |
| G06F 8/71 | (2018.01) |
| G06F 21/71 | (2013.01) |
| G06F 21/62 | (2013.01) |

(52) U.S. Cl.
CPC .............. *G06F 21/572* (2013.01); *G06F 8/71* (2013.01); *G06F 21/6227* (2013.01); *G06F 21/71* (2013.01)

(58) Field of Classification Search
CPC ...... G06F 21/572; G06F 8/71; G06F 21/6227; G06F 21/71; G06F 2221/2143; G06F 9/44505; G06F 21/575; G06F 21/6254; G06F 9/4401
See application file for complete search history.

(56) References Cited

U.S. PATENT DOCUMENTS

| 2010/0192220 A1* | 7/2010 | Heizmann ........... G06F 11/3664 |
|---|---|---|
| | | 717/124 |
| 2017/0220781 A1* | 8/2017 | Odom .................... G06F 16/972 |
| 2017/0366478 A1* | 12/2017 | Mohammed ............ H04L 51/02 |
| 2018/0107470 A1* | 4/2018 | Remis ........................ G06F 8/65 |
| 2018/0144036 A1* | 5/2018 | Kramer ............... G06F 21/6254 |
| 2021/0081238 A1* | 3/2021 | Lamberts .............. H04L 9/3239 |

\* cited by examiner

*Primary Examiner* — Xuxing Chen
(74) *Attorney, Agent, or Firm* — Kirton McConkie; Brian Tucker

(57) ABSTRACT

Discovery of unique identifiers in firmware can be prevented. During the boot process on a computing system, and after the firmware has generated firmware tables containing unique identifiers, an anonymizer module of the firmware can generate an anonymized version of the firmware tables and cause the anonymized version of the firmware tables, rather than the original, system-unique firmware tables, to be accessible after the operating system is loaded. In this way, once the operating system is loaded, when a module attempts to read the firmware tables, the read will be performed against the anonymized version of the firmware tables thereby preventing the module from obtaining any of the computing system's unique identifiers. A copy of the firmware tables may be maintained separately from the anonymized version of the firmware tables to enable authorized utilities to obtain the computing system's unique identifiers.

20 Claims, 11 Drawing Sheets

Computing System 200

Memory 205

BIOS Information Table

| BIOS Vendor | Dell Inc. |
|---|---|

System Information Table

| Manufacturer | Dell Inc. |
|---|---|
| Product Name | Precision 7720 |
| Serial Number | 52LP7H2 |

Base Board Information Table

| Manufacturer | Dell Inc. |
|---|---|
| Serial Number | /52LP7H2/CN129... |

Chassis Information Table

| Manufacturer | Dell Inc. |
|---|---|
| Serial Number | 52LP7H2 |

OEM Strings Table

| Manufacturer | Dell Inc. |
|---|---|
| String 1 | Dell System |
| String 2 | 1[07B1] |
| String 3 | 3[1.0] |
| String 4 | 12[www.dell.com] |
| String 5 | 14[1] |
| String 6 | 15[u] |
| String 7 | 27[1104129 2054] |

Memory Device Table

| Manufacturer | 80AD000080AD |
|---|---|
| Serial Number | 71C62895 |
| Asset Tag | 01172400 |
| Part Number | HMA82G27... |

Processor Information Table

| Serial Number | 3965A1B0 |
|---|---|
| Asset Tag | 125980 |
| Part Number | AC3180540 |

Portable Battery Table

| Serial Number | 9C2A |
|---|---|
| Device Name | DELL RDYCT76 |

System Power Supply Table

| Serial Number | 2813695436 |
|---|---|

PREVENTING DISCOVERY OF UNIQUE IDENTIFIERS IN FIRMWARE

CROSS-REFERENCE TO RELATED APPLICATIONS

N/A

BACKGROUND

BIOS is the first software that is executed on the central processing unit (CPU) when a computing system is powered on. The primary task of the BIOS is to initialize the hardware and load the operating system (OS). For purposes of this specification and the claims, the term "firmware" should be construed as encompassing conventional (legacy) BIOS, Unified Extensible Firmware Interface (UEFI) BIOS and any other similar firmware that is used to boot a computing system and is intended to be distinguishable from the operating system. For example, on a Dell computing system, Dell may provide much of the firmware for booting the Windows operating system.

FIG. 1 represents the boot process that the firmware performs on a computing system. FIG. 1 is intended to encompass both conventional BIOS and UEFI boot processes but will be described primarily in the context of the UEFI. FIG. 1 depicts hardware 110 which can represent all of the various types of hardware that may exist on a computing system including flash 111. Flash 111, which may be in the form of Serial Peripheral Interconnect (SPI) flash, is commonly employed to store the boot block. The boot block is the initial firmware that is loaded and executed when the computing system is powered on or resets (e.g., the code that the reset vector points to). Flash 111 may also typically store other portions of the firmware (e.g., UEFI variables).

During the PEI phase, PEIM modules (or drivers) are loaded to initialize the low level hardware such as the system memory. Additional UEFI services are also loaded and provide an interface for subsequent stages including the Driver Execution Environment (DXE) phase in which UEFI drivers are loaded to perform a variety of tasks. The boot process will then transition to the Boot Device Selection (BDS) phase where the GUID Partition Table (GPT) or Master Boot Record (MBR) is accessed to identify and load the OS boot loader. The OS boot loader will then load the OS kernel and transfer control the OS.

During this boot process, the firmware typically generates a number of firmware tables that provide information about the computing system. For example, FIG. 2 provides a simplified example of a number of firmware tables that may be generated in memory 205 of a computing system 200 during the boot process including a BIOS information table, a system information table, a base board information table, a chassis information table, an OEM strings table, a memory device table, a processor table, a portable battery table, a system power supply table, etc. In addition to generating such firmware tables during the boot process, the firmware causes these firmware tables to remain accessible after the operating system is loaded. The operating system, in turn, typically provides functionality to enable applications, services or other components to read these firmware tables. For example, Windows provides a number of Windows Management Instrumentation (WMI) classes that could be used to read these or other firmware tables.

As represented in FIG. 2, the firmware tables that the firmware generates during the boot process may define one or more identifiers that could be used either individually or in combination to uniquely identify computing system 200. For purposes of this specification and the claims, the term "unique identifiers" will be used to represent any combination of one or more identifiers that the firmware makes available while the operating system is loaded.

Because the unique identifiers remain accessible after the operating system is loaded, they could be used to bypass mechanisms for anonymizing computing system 200. As an example, FIG. 3 represents a scenario where a webpage loaded in a browser on computing system 200 could employ any suitable operating-system-provided functionality to read the system information table to identify the manufacturer, product name and serial number of computing system 200. The webpage could then relay these "unique identifiers" to a tracker on a server which could then employ the unique identifiers to track computing system 200's internet activity. In this way, even if the operating-system-level components on computing system 200 are configured to prevent such tracking (e.g., by using incognito mode in the browser, by blocking cookies, by hiding computing system 200's MAC address, etc.), tracking will not be prevented.

BRIEF SUMMARY

The present invention extends to methods, systems, and computer program products for preventing discovery of unique identifiers in firmware. By preventing discovery of the unique identifiers, embodiments of the present invention can prevent tracking or otherwise anonymize a computing system. During the boot process on a computing system, and after the firmware has generated firmware tables containing unique identifiers, an anonymizer module of the firmware can generate an anonymized version of the firmware tables and cause the anonymized version of the firmware tables, rather than the original, system-unique firmware tables, to be accessible after the operating system is loaded. In this way, once the operating system is loaded, when a module attempts to read the firmware tables, the read will be performed against the anonymized version of the firmware tables thereby preventing the module from obtaining any of the computing system's unique identifiers.

In some embodiments, the anonymizer module may also be configured to retain a copy of the firmware tables in addition to the anonymized version of the firmware tables. In such cases, the anonymizer module can be configured to evaluate a request to read the firmware tables and, when the request is made by an authorized module, process the request against the copy of the original, system-unique firmware tables. In contrast, when the request is made by an unauthorized module, the anonymizer module can process the request against the anonymized version of the firmware tables.

In some embodiments, the present invention may be implemented as a method for preventing discovery of unique identifiers in firmware. During a boot process on a computing system, a firmware table that includes one or more unique identifiers of the computing system can be identified. An anonymized version of the firmware table can be created by replacing at least one of the one or more unique identifiers with an anonymized identifier. The anonymized version of the firmware table rather than the firmware table can then be made accessible to an operating system.

In some embodiments, the present invention may be implemented as computer storage media storing computer executable instructions which when executed on a computing system perform a method for preventing discovery of unique identifiers in firmware. This method may include, after a firmware table has been generated, creating an anonymized version of the firmware table, and causing the anonymized version of the firmware table rather than the firmware table to be accessible to an operating system.

In some embodiments, the present invention may be implemented as a computing system that includes one or more processors, memory and firmware that includes an anonymizer module that is configured to prevent discovery of unique identifiers in the firmware. The anonymizer module can identify one or more firmware tables that have been generated in the memory. For each of the one or more firmware tables, the anonymizer module can create an anonymized version of the firmware table. The anonymizer module may also store a copy of each of the firmware tables separately from the anonymized version of each of the one or more firmware tables.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 2 provides an example of firmware tables that the firmware may generate during the boot process;

DETAILED DESCRIPTION

Figure 4:
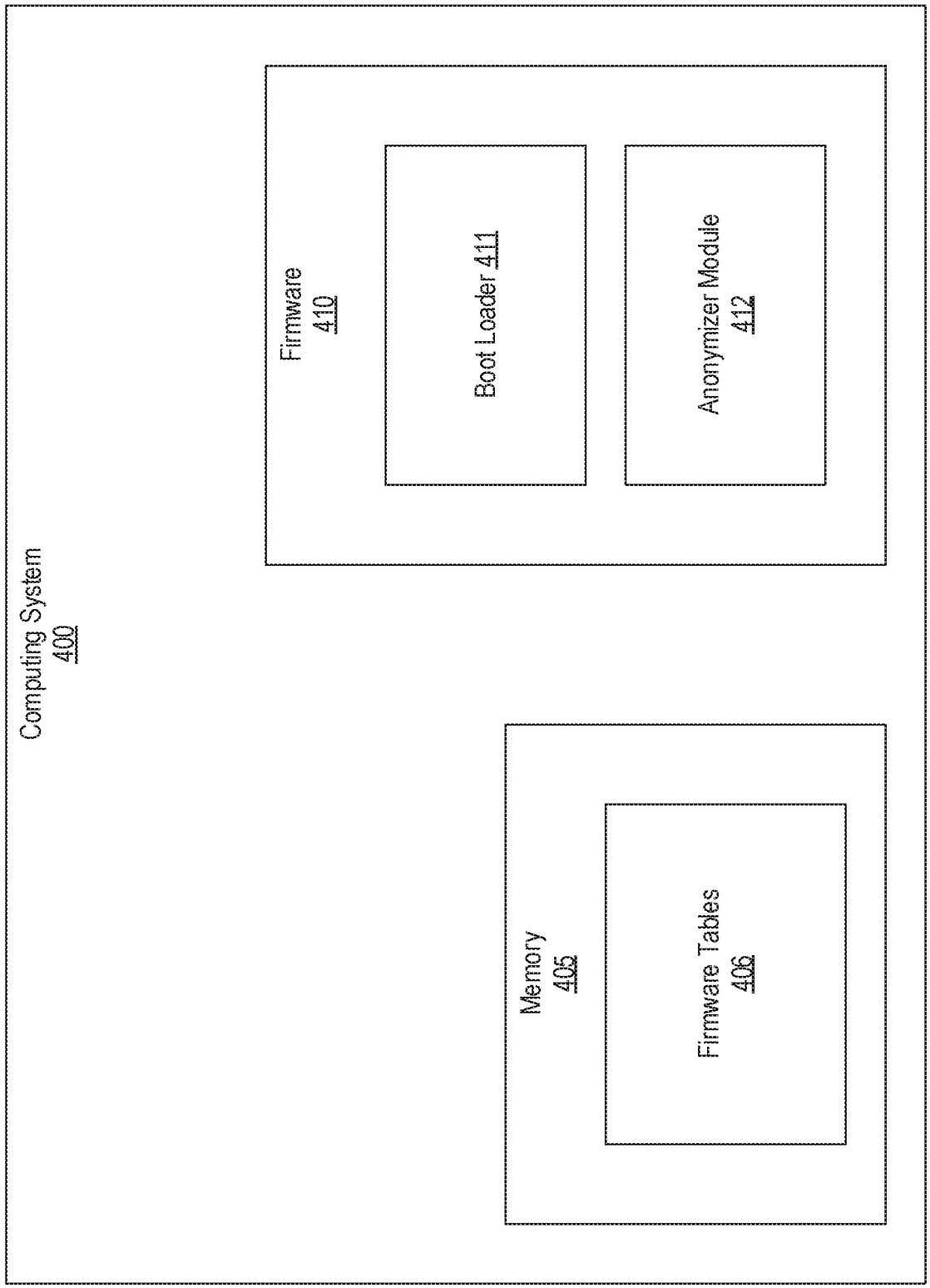
FIG. 4 provides an example of how a computing system's firmware can be configured to prevent the discovery of unique identifiers in firmware.

FIG. 4 provides an example configuration of a computing system 400 that may be employed to implement embodiments of the present invention. Computing system 400, which is shown as including memory 405 but would also include other hardware such as a CPU, is intended to represent any type of computing system that may include firmware 410 for booting an operating system (not shown). Firmware 410 is shown as including a boot loader 411 and an anonymizer module 412 but would typically include many other components, including those that create firmware tables 406 as described in the background. Firmware tables 406 can represent any collection of data that firmware 410 creates in memory 405 and makes available while the operating system is loaded. The firmware tables shown in FIG. 2 are some examples of what firmware tables 406 may encompass.

FIG. 4 is also intended to generally represent the state of computing system 400 during the boot process. In particular, it is assumed that the boot process has proceeded to the point that firmware 410 has created firmware tables 406 in memory 405 and boot loader 411 has been invoked to commence loading the operating system. In a UEFI-based implementation, boot loader 411 may be configured to invoke the ExitBootServices function. In general terms, the ExitBootServices function terminates all boot services (i.e., all portions of the firmware that are not runtime services) and will result in boot loader 411 obtaining control of all available portions of memory 405. As mentioned above, firmware tables 406 will be stored in memory 405 such that they will remain available even after boot loader 411 loads the operating system.

Anonymizer module 412 can be configured to execute during the boot process at a time when firmware tables 406 have been created but prior to control being passed to the operating system. For example, anonymizer module 412 could be configured to hook boot loader 411's call to the ExitBootServices function or otherwise register to be called immediately before, during or immediately after firmware 410's handling of the call to the ExitBootServices function. Of course, anonymizer module 412 could leverage any suitable technique for being invoked or otherwise performing the functionality described herein after firmware tables 406 have been generated but before transitioning control to the operating system. Therefore, even though embodiments of the present invention will be described in the context of the invocation of the ExitBootServices function, the present invention should not be limited to such context.

Figure 5A:
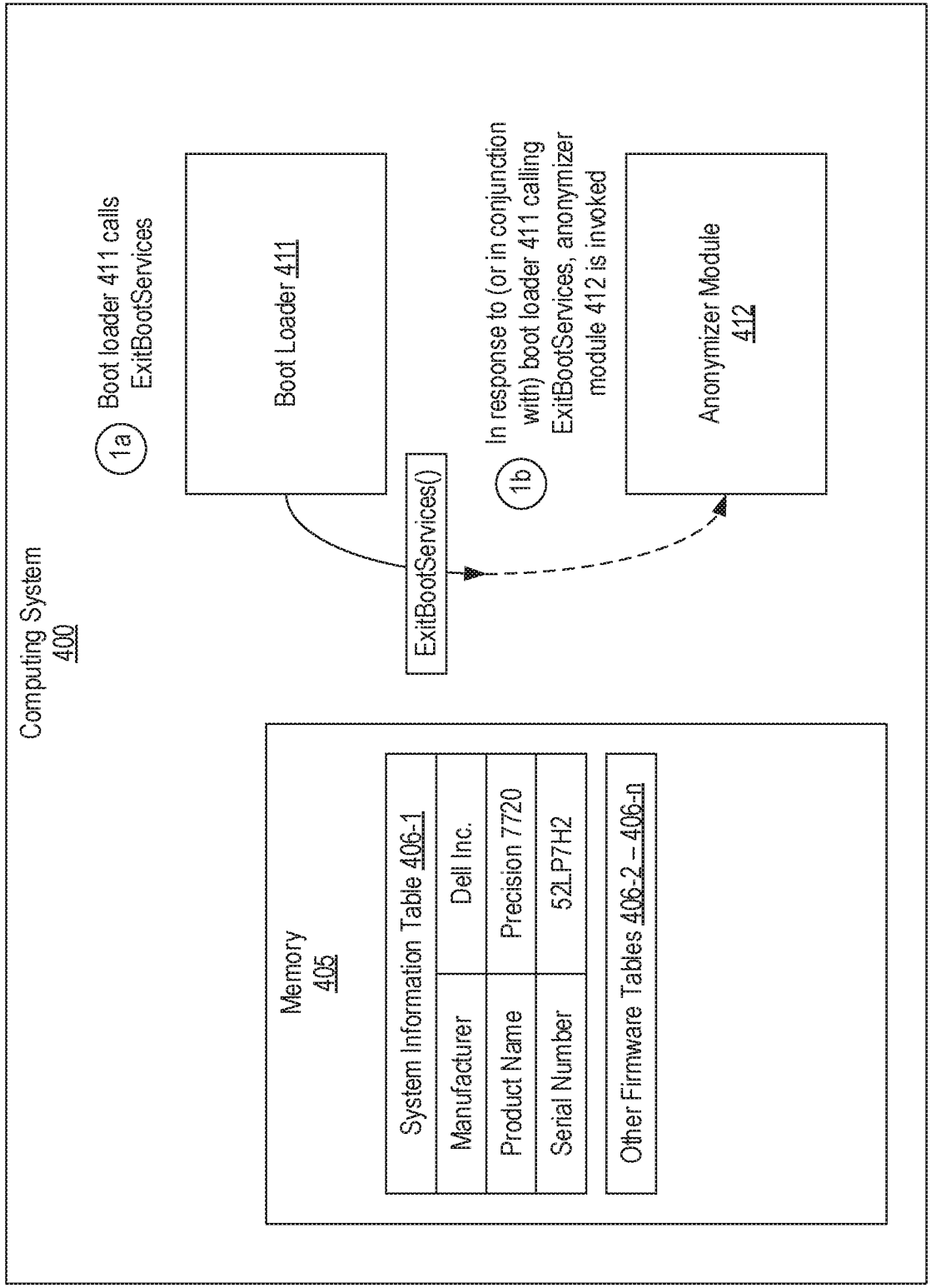
FIGS. 5A-5E illustrate an example process by which the discovery of a computing system's unique identifiers in firmware can be prevented.
Figure 5B:
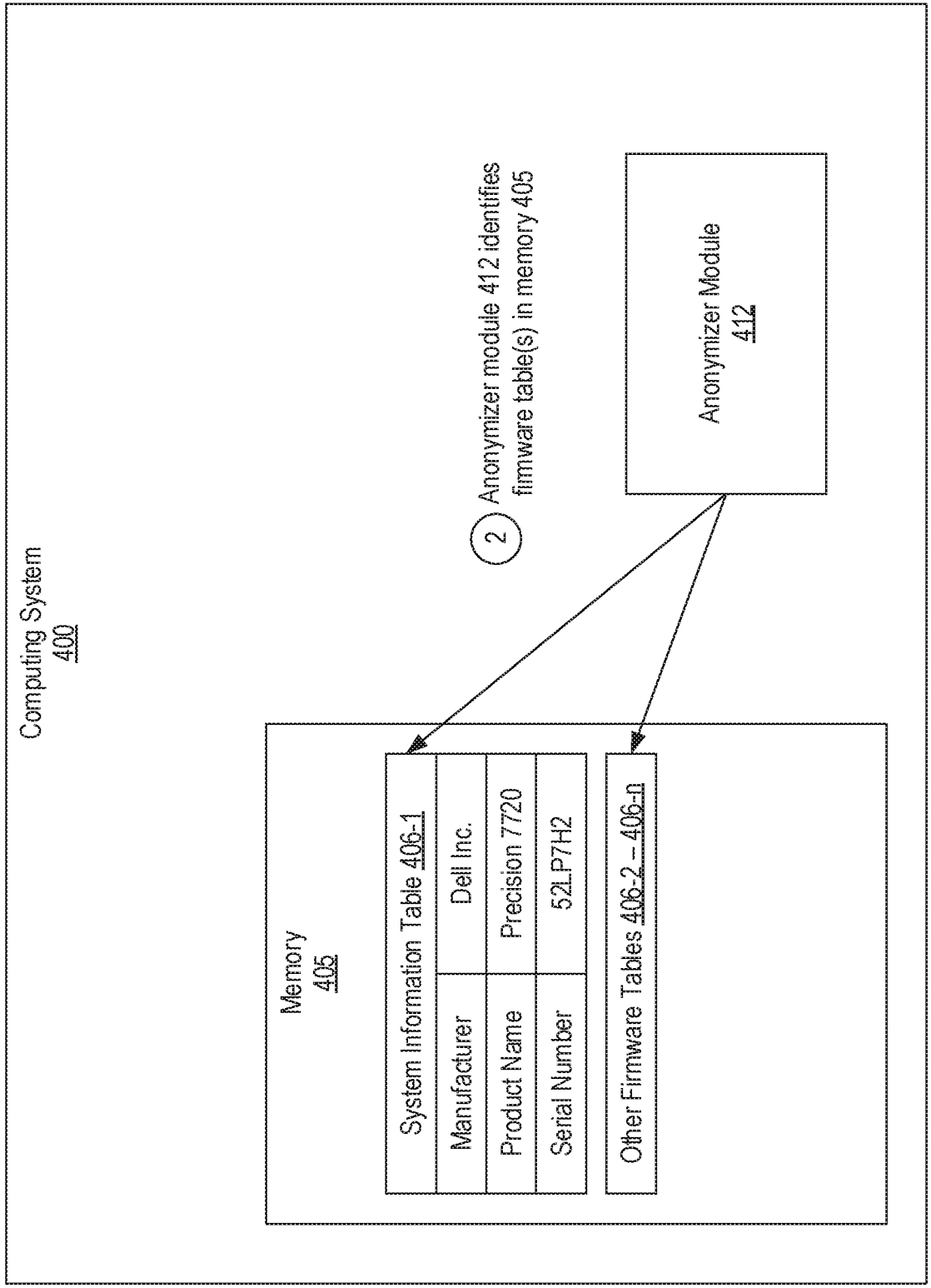
Figure 5C:
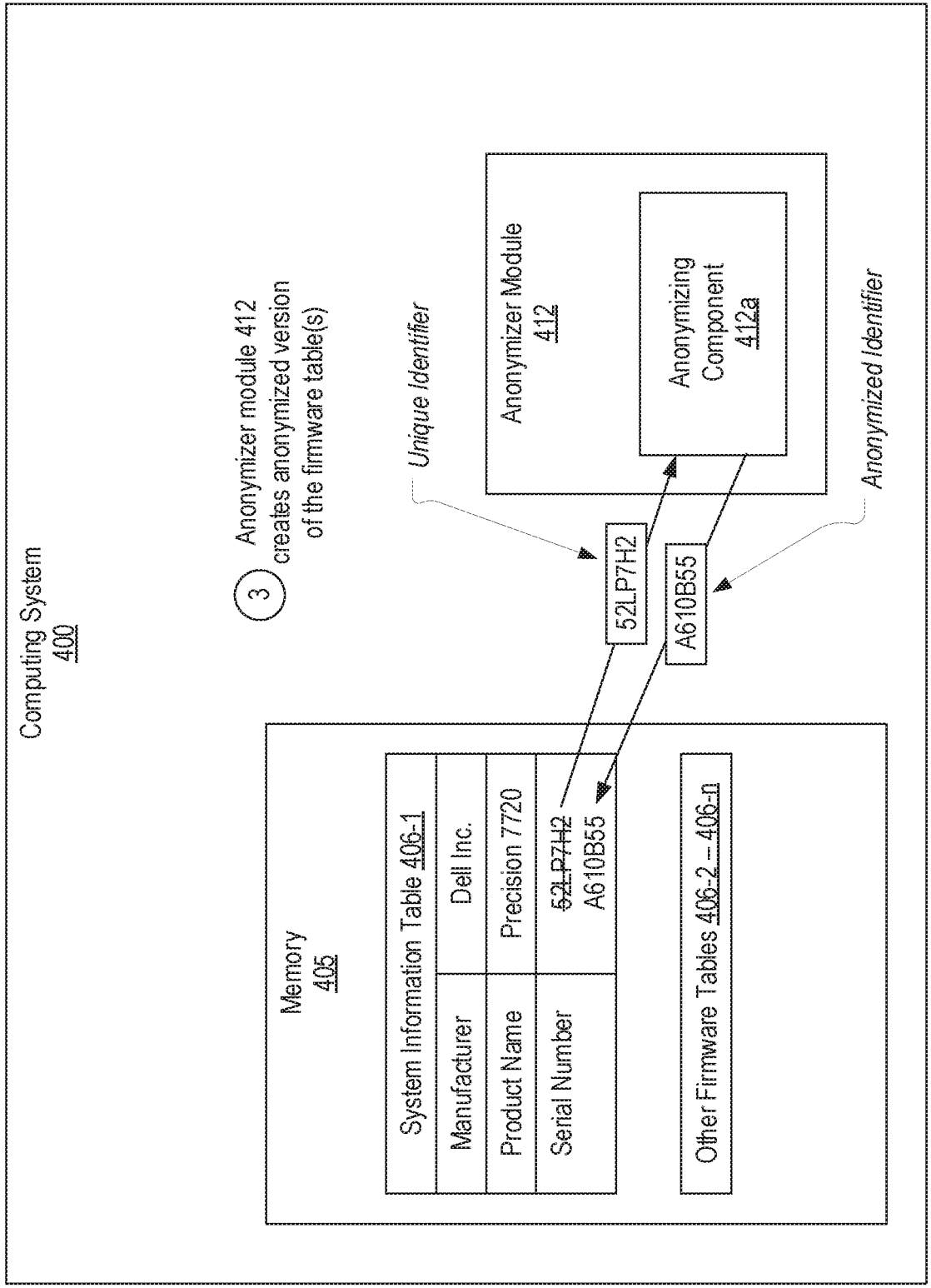

FIGS. 5A-5C provide an example of how anonymizer module 412 may prevent the discovery of unique identifiers in firmware, or, in this example, the discovery of unique identifiers contained in firmware tables 406. FIG. 5A represents that boot loader 411 may call the ExitBootServices (or equivalent) function in step 1a. In response to (or in conjunction with) boot loader 411 calling the ExitBootServices function, in step 1b, anonymizer module 412 may be invoked. As mentioned above, anonymizer module 412 may cause step 1b to be performed by hooking the ExitBootServices function, registering a callback that platform firmware may call when the ExitBootServices function is invoked or any other suitable technique that may be available on a particular computing system or within particular firmware implementations. In some embodiments, step 1b need not be performed in conjunction with the ExitBootServices function being called but could be performed at a time and/or in a manner that ensures the anonymizer module 412 can perform the functionality described herein after firmware 410 has completed generating firmware tables 406.

Turning to FIG. 5B, once anonymizer module 412 is invoked, in step 2, it can identify one or more firmware tables that exist in memory 405. For example, some firmware tables may be stored in the same address range(s) at each boot, and in such cases, anonymizer module 412 may be configured to access such address range(s). In contrast, some firmware tables may be stored in different address range(s) at each boot, and in such cases, anonymizer module 412 may perform suitable functionality to identify where in memory 405 such firmware tables are stored. For example, anonymizer module 412 could be configured to retrieve the memory map and use it to identify where each of firmware tables 406 is stored. It is noted that anonymizer module 412 need not identify all firmware tables, but may only identify any firmware table that may store one or more unique identifiers—or at least any firmware table that may store one or more unique identifiers that anonymizer module 412 is configured to anonymize using the techniques described below. Accordingly, embodiments of the present invention encompass instances where anonymizer module 412 may be configured to process one, two or any other number of firmware tables.

Turning to FIG. 5C, once anonymizer module 412 has identified a firmware table in memory 405 that it should process, in step 3, anonymizer module 412 can create an anonymized version of the firmware table. An anonymized version of a firmware table should be construed as a version of the firmware table where at least one value has been modified in a manner that will ensure that the anonymized version of the firmware table will be different at each reboot. Anonymizer module 412 may include an anonymizing component 412a for this purpose.

In some embodiments, anonymizing component 412a could be a random number generator that takes a unique identifier as input and outputs a random value that can function as an "anonymized identifier". In such embodiments, the random number generator could be configured to generate an anonymized identifier from a unique identifier where the anonymized identifier has the same general format as the unique identifier (e.g., the same length, the same format (such as text or numbers), etc.) For example, FIG. 5C represents a scenario where anonymizing component 412a randomly generates an anonymized identifier (or serial number) of "A610B55" from the unique identifier (or serial number) "52LP7H2."

In other embodiments, anonymizing component 412a could generate an anonymized identifier without relying directly on a unique identifier. For example, anonymizer module 412 could request anonymizing component 412a to generate a random value of a particular length without inputting a unique identifier and then use the random value as the anonymized identifier. Similarly, anonymizing component 412a could provide an anonymized identifier other than by random generation. For example, anonymizing component 412a could be configured to provide a different anonymized identifier out of a set of possible anonymized identifiers for a particular unique identifier over a number of reboots. In short, anonymizing component 412a could provide an anonymized identifier in many different ways and should not be limited to random number/value generation.

Regardless of how anonymizing component 412a generates an anonymized identifier, anonymizer module 412 can replace the corresponding unique identifier in the firmware table with the anonymized identifier. For example, FIG. 5C represents that anonymizer module 412 has replaced the serial number of "52LP7H2" in system information table 406-1 with the anonymized serial number of "A610B55." After this replacement, system information table 406-1 can be considered a "modified version" of this firmware table. In other words, anonymizer module 412 may create a modified version of a firmware table by replacing a single unique identifier in the firmware table with an anonymized identifier. However, anonymizer module 412 may equally create a modified version of a firmware table by replacing more than one unique identifier or all unique identifiers (or all values) in the firmware table. For example, in the context of FIG. 5C, anonymizer module 412 may replace "Dell Inc." and/or "Precision 7720" in system information table 406-1 with corresponding anonymized identifiers.

Figure 5D:
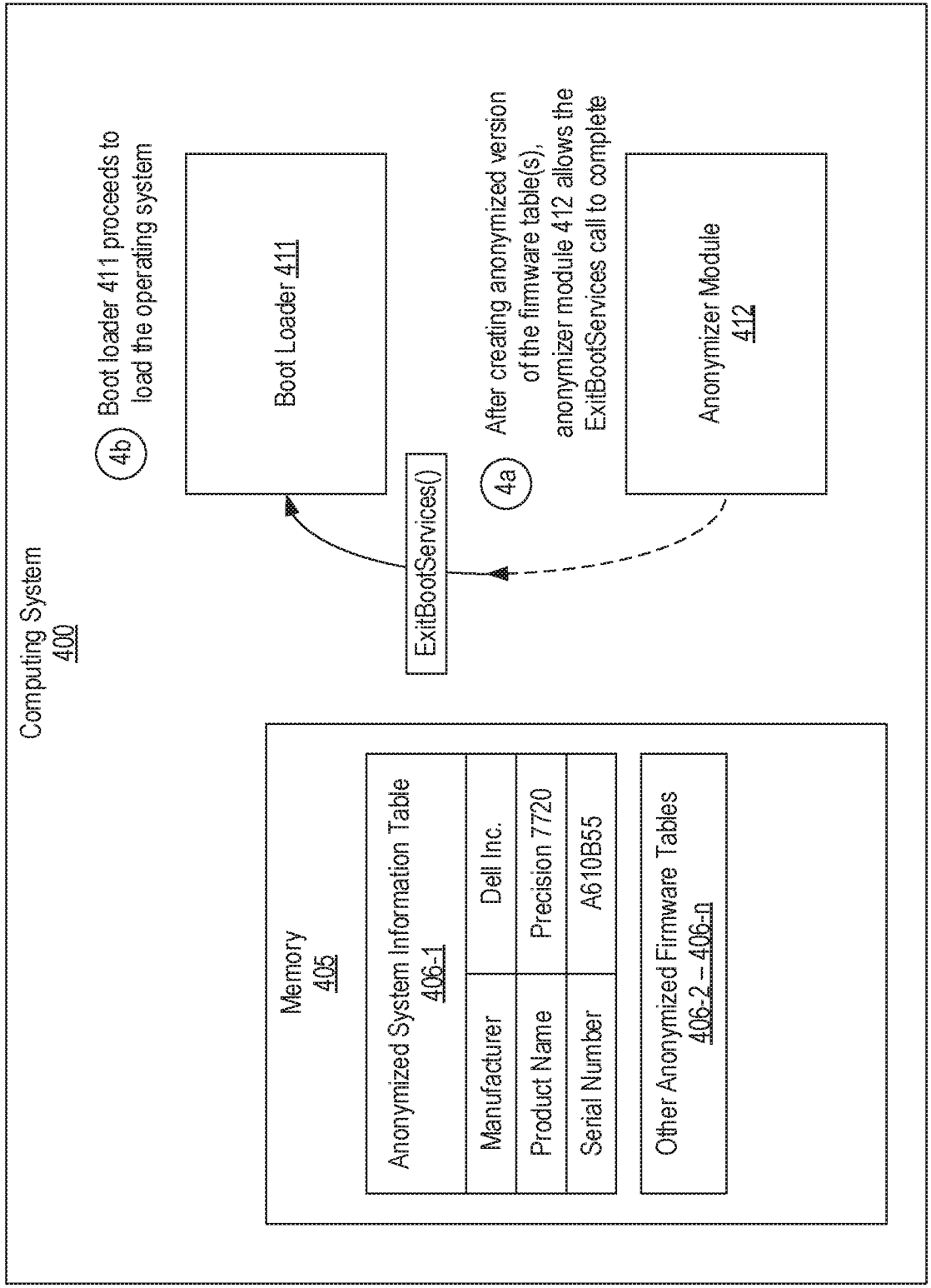

Anonymizer module 412 can perform step 3 for any number of firmware tables 406. For example, anonymizer module 412 could be configured to create an anonymized version of any of firmware tables 406 that could possibly be leveraged to track computing system 400. As represented in FIG. 5D, after anonymizer module 412 creates the anonymized version of the firmware table(s), in step 4a, it can allow the call to the ExitBootServices function to complete. Then, in step 4b, boot loader 411 can proceed to load the operating system. Notably, once the operating system is loaded, the operating system will see the anonymized version of the firmware table(s) rather than the actual version of the firmware table(s). In other words, from the operating system's perspective, the anonymized version of the firmware table(s) are the actual firmware tables.

Figure 1:
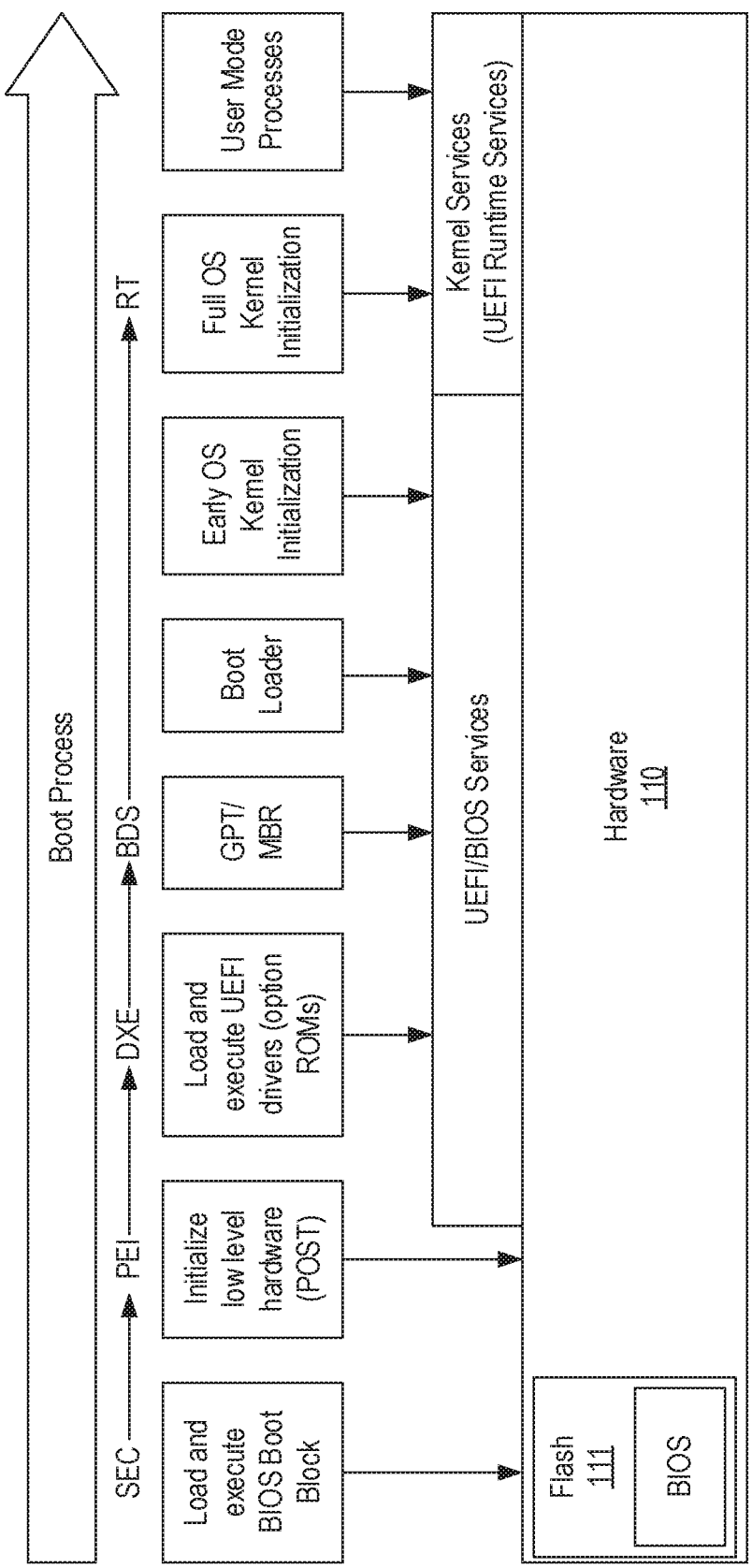
FIG. 1 illustrates an example of a typical boot process that can be performed on a computing system including various types of firmware that are involved in the typical boot process.
Figure 3:
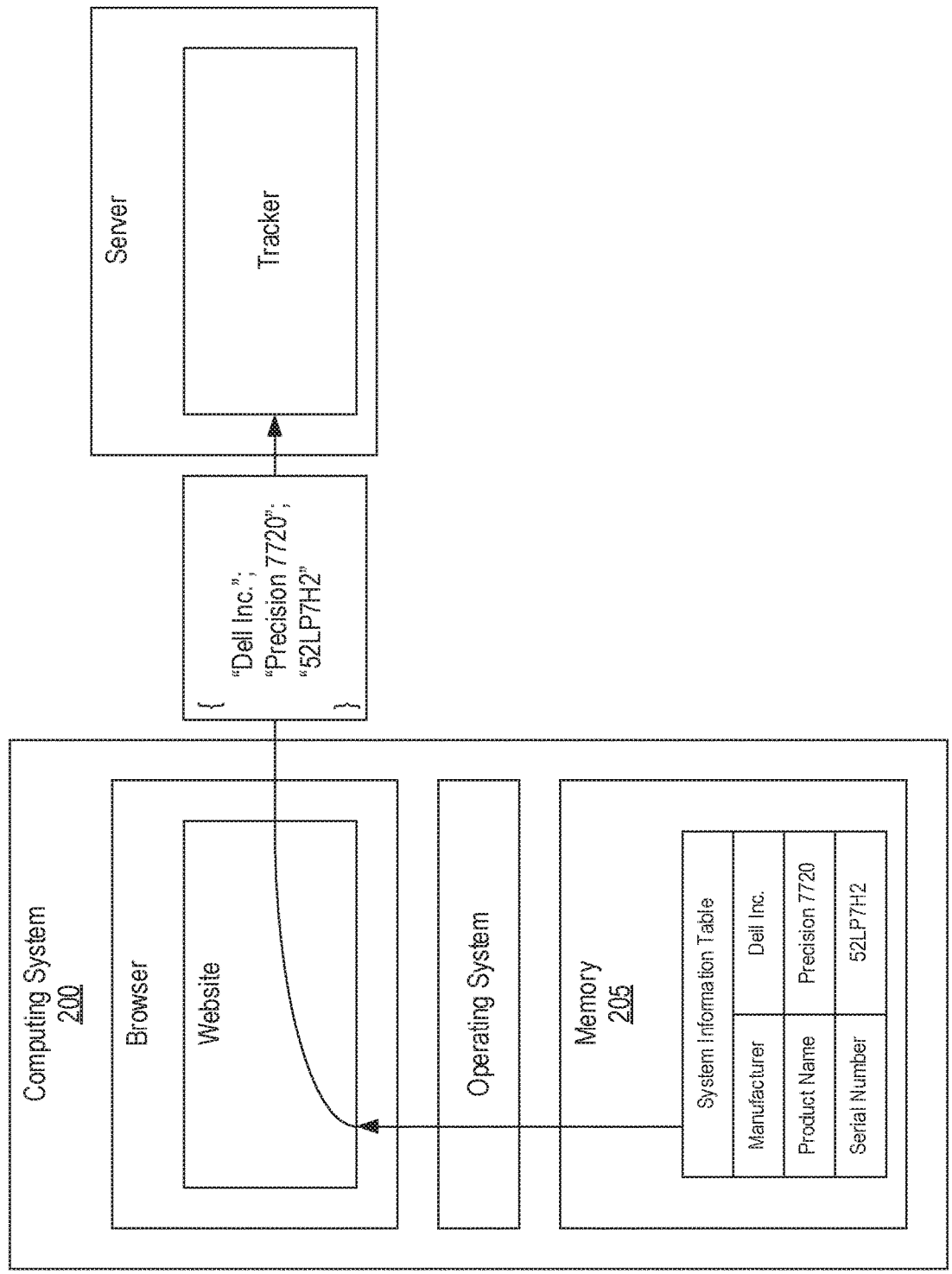
FIG. 3 provides an example of how the firmware tables that the firmware generates may be used to track a computing system.
Figure 5E:
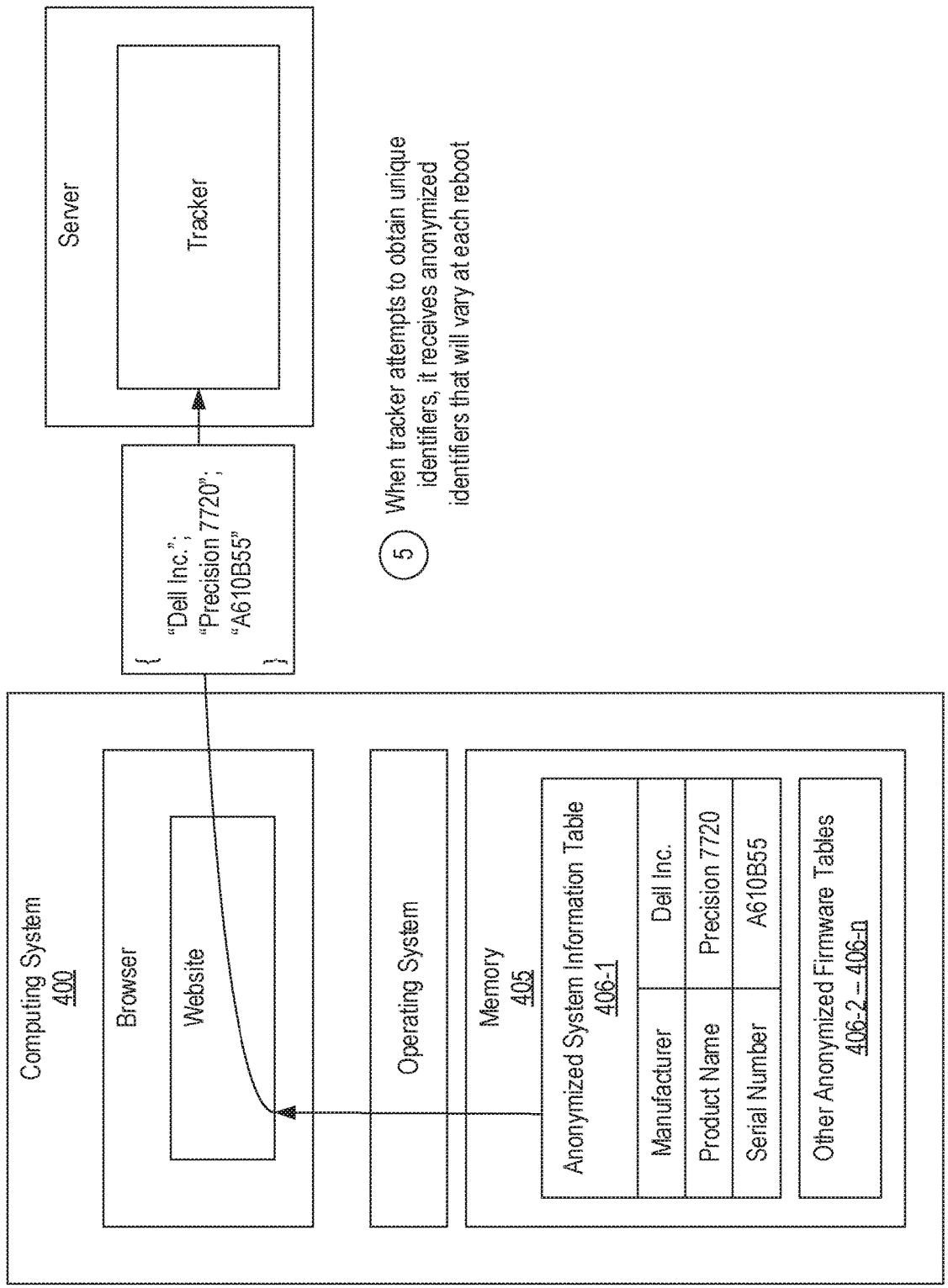

Turning to FIG. 5E, which is intended to resemble FIG. 3, a tracker is represented, in step 5, as using a website to read what it believes are unique identifiers of computing system 400 from system information table 406-1. However, due to anonymizer module 412 having created anonymized system information table 406-1 during the boot process, the tracker will actually receive anonymized identifiers that will vary at each reboot. Accordingly, if the tracker attempts to track computing system 400 using these anonymized identifiers, it will be unable to adequately do so because the anonymized identifiers will be different the next time computing system 400 boots.

As a particular example, the tracker may store the serial number "A610B55" and attempt to use it to track computing system 400. However, at the next reboot, anonymizing module 412 may create an anonymized version of system information table 406-1 that includes a different, randomly generated serial number. Therefore, during the next reboot, if the user visits a webpage associated with the tracker, the tracker will obtain a serial number of computing system 400 that will not match the serial number "A610B55" that it previously stored. As such, the tracker will be unable to use the current serial number defined in system information table 406-1 to link computing system 400's internet activity during this next reboot to any of computing system 400's prior internet activity.

In some embodiments, it may be desirable to maintain a copy of any firmware table for which an anonymized version of the firmware table was created. For example, some utilities may rely on unique identifiers to perform their intended functionality including update utilities, diagnostic utilities or other utilities that an OEM may provide to manage its computing systems.

Figure 6:
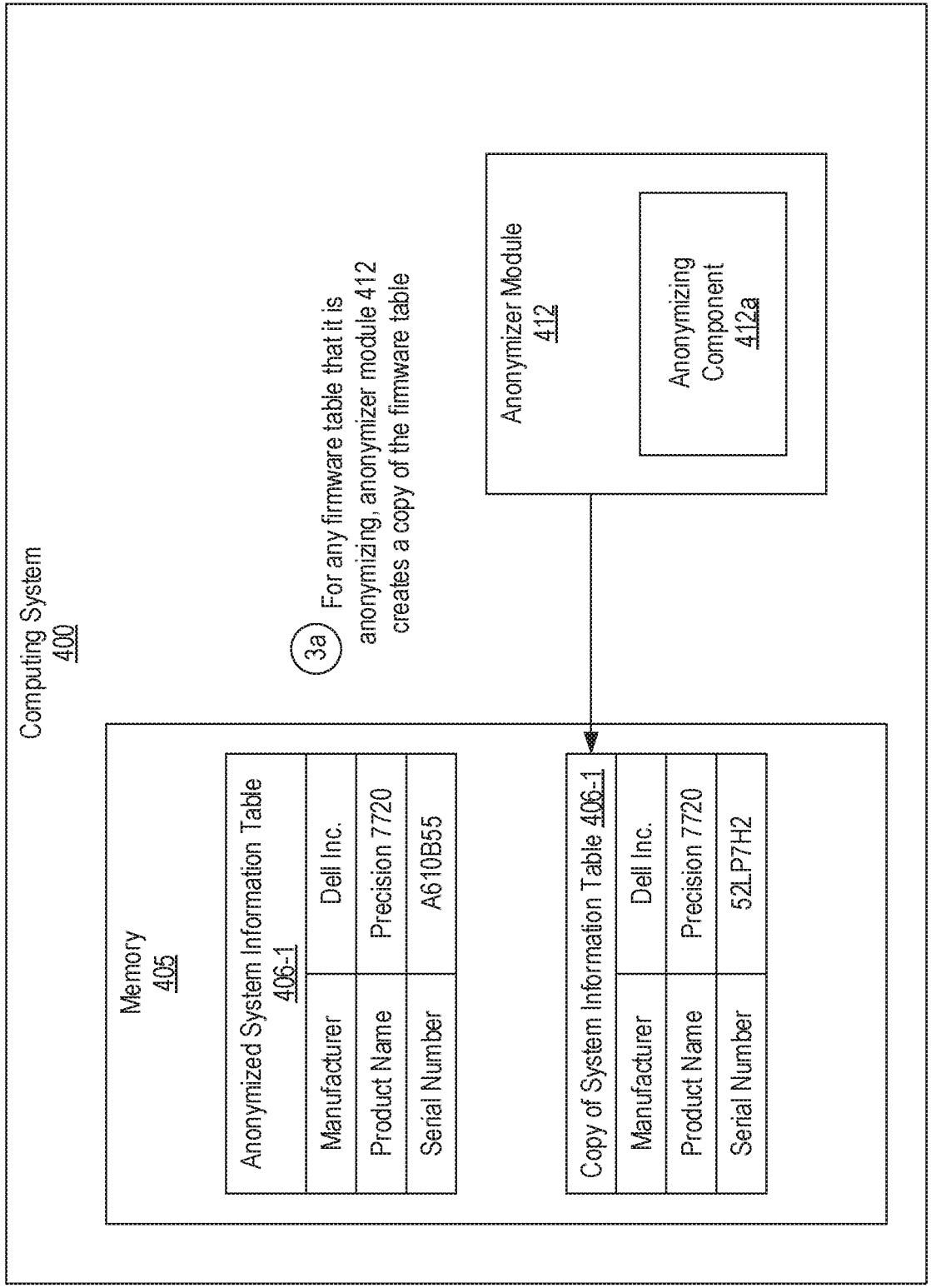
FIG. 6 provides an example of how a copy of a firmware table can be stored separately from an anonymized version of the firmware table.

FIG. 6 provides an example of how anonymizer module 412 may create a copy of a firmware table in the context of FIG. 5C. In step 3, which anonymizer module 412 may perform in conjunction with step 3 of FIG. 5C, anonymizer module 412 is shown as creating a copy of system information table 406-1. Anonymizer module 412 may store this copy of system information table 406-1 in a portion of memory 405 that it controls/manages. In other words, the copy of system information table 406-1 will be separate from anonymized system information table 406-1 which the operating system will view as the actual system information table 406-1. Accordingly, when the operating system reads the system information table, it will read from the anonymized system information table and not from the copy that includes the unique identifier(s).

In more technical terms, anonymized system information table 406-1 will be stored in a manner in which it can be read using the industry standard interfaces (e.g., the UEFI/ACPI interfaces). In contrast, the copy of system information table 406-1 will be stored in a manner in which access is controlled by anonymizer module 412. To enable this, anonymizer module 412 (or at least a component of anonymizer module 412) may be configured as a runtime service so that it remains accessible once the operating system is loaded. In such cases, the copy of system information table 406-1 (or any other copy of a firmware table that anonymizer module 412 may have created) can be stored in a portion of memory associated with the runtime service. Anonymizer module 412 could equally cause the copy of any firmware table to be persisted in other ways such as by writing the copy to an ACPI table or to a region of ACPI non-volatile memory. Once the operating system is loaded, anonymizer module 412 (or a component of anonymizer module 412 that is loaded after the operating system is loaded) could store the copy of any firmware table in a file system or other storage location that was not yet available during the boot process. In short, anonymizer module 412 could cause a copy of any firmware table to be maintained in a variety of ways and in a variety of storage locations.

Figure 7:
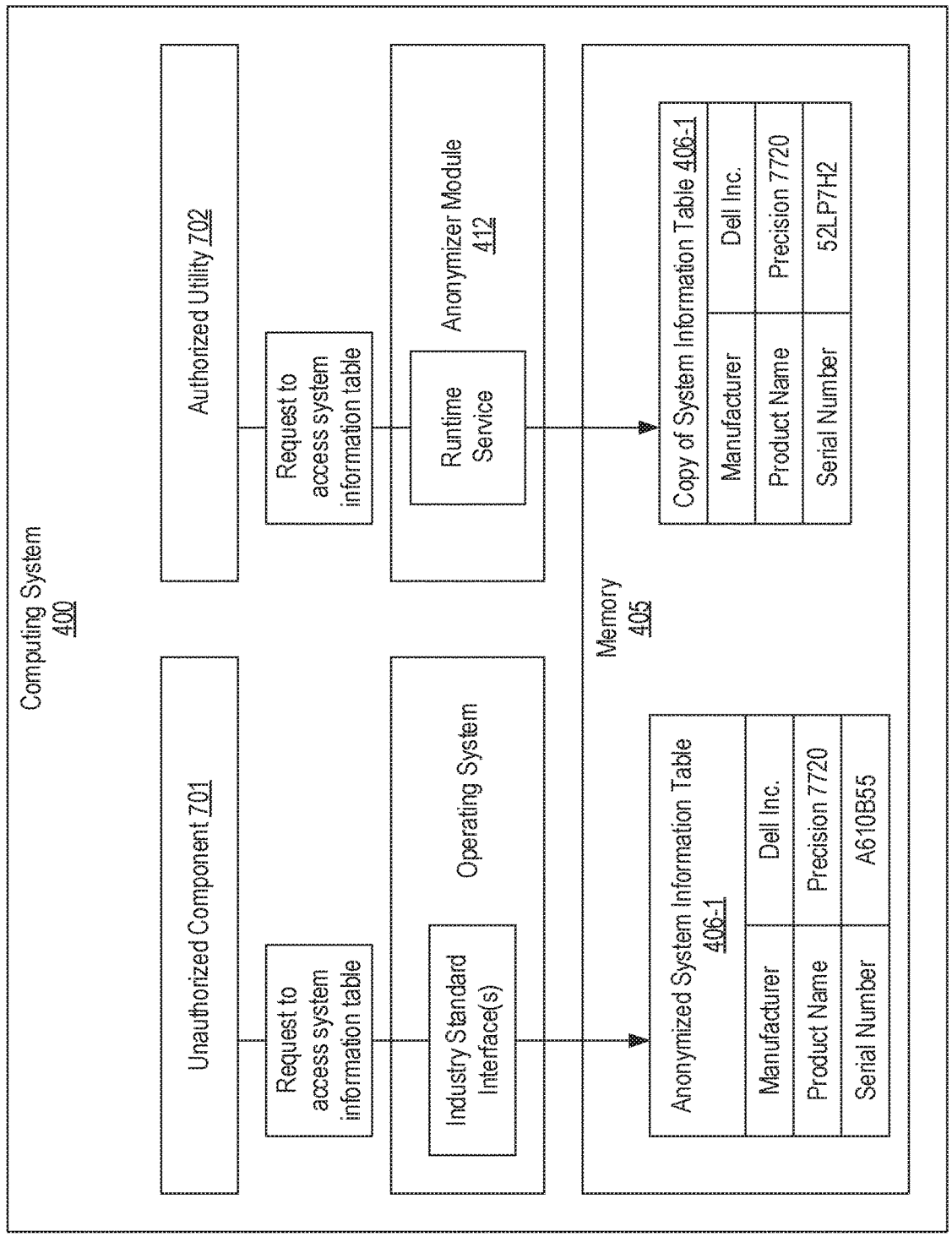
FIG. 7 provides an example of how an authorized utility can access a firmware table to obtain a computing system's unique identifiers while unauthorized components are limited to accessing the corresponding anonymized identifiers.

FIG. 7 represents how requests to access a firmware table, which in this case is the system information table, may be performed differently based on whether the requestor is authorized to access the "actual" firmware table. On the left side of FIG. 7, an unauthorized component 701 is shown as using the industry standard interfaces to submit a request to access the system information table. As described above, due to the functionality performed by anonymizer module 412, the request will be completed using the anonymized system information table 406-1, and particularly, by returning the anonymized identifiers contained therein. In contrast, on the right side of FIG. 7, an authorized utility 702, which could represent any component that is aware of anonymizer module 412, can also submit a request to access the system information table, but this request will be directed to anonymizer module 412 (e.g., executing as a runtime service or as a separate component that is loaded after the operating system is running). Based on the assumption that authorized utility 702 is authorized to access the copy of system information table 406-1, anonymizer module 412 can complete the request by returning the unique identifiers stored in the copy of system information table 406-1. In this way, authorized utility 702 will still be able to obtain the unique identifiers while any unauthorized component will only obtain anonymized identifiers.

In some embodiments, anonymizer module 412 may provide a mechanism for an authorized utility to read any firmware table including those for which an anonymized version was not created. In such cases, anonymizer module 412 may evaluate a request to read a firmware table to determine whether an anonymized version of the firmware table exists. If so, and assuming the request is authorized, the request can be completed by accessing the copy of the firmware table. If not, anonymizer module 412 could cause the request to be completed using the industry standard techniques. Likewise, if anonymizer module 412 receives a request that is not authorized, it can cause the request to be completed using the industry standard techniques which will cause the request to be completed using an anonymized firmware table if one was created.

In summary, embodiments of the present invention can be employed to anonymize the unique identifiers in firmware that could otherwise be used to track a computing system. This anonymizing of the unique identifiers can be performed while still retaining the ability to access the firmware tables which can ensure that the firmware remains compliant with industry standards and/or with the operating system's expectations.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for preventing discovery of unique identifiers in firmware, the method comprising:
   during a boot process on a computing system, identifying a firmware table that includes one or more unique identifiers of the computing system;

creating an anonymized version of the firmware table by replacing at least one of the one or more unique identifiers with an anonymized identifier; and causing the anonymized version of the firmware table rather than the firmware table to be accessible to an operating system.

2. The method of claim 1, wherein the firmware table is identified in conjunction with a boot loader being executed.

3. The method of claim 2, wherein the firmware table is identified in response to the boot loader calling the ExitBootServices function.

4. The method of claim 1, wherein the anonymized identifier is randomly generated.

5. The method of claim 4, wherein the anonymized identifier is randomly generated from the corresponding unique identifier.

6. The method of claim 1, wherein the firmware table includes multiple unique identifiers and wherein creating the anonymized version of the firmware table comprises replacing each of the multiple identifiers with a respective anonymized identifier.

7. The method of claim 1, further comprising:
identifying one or more additional firmware tables that each include one or more unique identifiers of the computing system;
for each of the one or more additional firmware tables, creating an anonymized version of the additional firmware table by replacing at least one of the one or more unique identifiers with an anonymized identifier; and
causing the anonymized version of each of the one or more additional firmware tables to be accessible to the operating system.

8. The method of claim 1, wherein the firmware table is stored in a first portion of memory and wherein causing the anonymized version of the firmware table rather than the firmware table to be accessible to the operating system comprises maintaining the anonymized version of the firmware table in the first portion of memory.

9. The method of claim 1, further comprising:
storing a copy of the firmware table separately from the anonymized version of the firmware table.

10. The method of claim 9, further comprising:
enabling an authorized utility to access the copy of the firmware table after the operating system is loaded.

11. One or more computer storage media storing computer executable instructions which when executed on a computing system perform a method for preventing discovery of unique identifiers in firmware, the method comprising:
after a firmware table has been generated, creating an anonymized version of the firmware table; and
causing the anonymized version of the firmware table rather than the firmware table to be accessible to an operating system.

12. The computer storage media of claim 11, wherein the firmware table includes one or more unique identifiers of the computing system and wherein creating the anonymized version of the firmware table comprises replacing each of the one or more unique identifiers with an anonymized identifier.

13. The computer storage media of claim 12, wherein replacing each of the one or more unique identifiers with an anonymized identifier comprises randomly generating the anonymized identifier.

14. The computer storage media of claim 11, wherein the anonymized version of the firmware table is created in response to a boot loader being executed.

15. The computer storage media of claim 11, wherein the method further comprises:
storing a copy of the firmware table separately from the anonymized version of the firmware table.

16. The computer storage media of claim 11, wherein the method further comprises:
after one or more additional firmware tables have been generated, creating, for each of the additional firmware tables, an anonymized version of the additional firmware table; and
causing the anonymized version of each of the one or more additional firmware tables rather than the one or more additional firmware tables to be accessible to the operating system.

17. A computing system comprising:
one or more processors;
memory; and
firmware stored on one or more computer storage media, the firmware including an anonymizer module that is configured to prevent discovery of unique identifiers in the firmware by performing the following:
identifying one or more firmware tables that have been generated in the memory;
for each of the one or more firmware tables, creating an anonymized version of the firmware table; and
storing a copy of each of the firmware tables separately from the anonymized version of each of the one or more firmware tables.

18. The computing system of claim 17, wherein the anonymizer module identifies the one or more firmware tables that have been generated in the memory before an operating system is loaded.

19. The computing system of claim 18, further comprising:
a component stored on the one or more computer storage media that enables an authorized utility to access the copy of each of the firmware tables.

20. The computing system of claim 19, wherein the component is either:
part of the firmware; or
a component that is loaded by the operating system.

* * * * *